United States Patent

[11] 3,604,682

| [72] | Inventor | Cecil G. F. Richards<br>Queensland, Australia |
|---|---|---|
| [21] | Appl. No. | 36,788 |
| [22] | Filed | May 13, 1970 |
| [45] | Patented | Sept. 14, 1971 |
| [73] | Assignee | B. C. Richards & Co., Pty. Ltd.<br>Queensland, Australia |

[54] SEAT ASSEMBLY FOR ROTARY BALL VALVES
3 Claims, 2 Drawing Figs.

| [52] | U.S. Cl. | 251/362, 251/174, 251/317 |
|---|---|---|
| [51] | Int. Cl. | F16k 11/04 |
| [50] | Field of Search | 251/174, 315, 317, 362 |

[56] References Cited
UNITED STATES PATENTS

| 3,387,815 | 6/1968 | Richards | 251/174 |
|---|---|---|---|
| 3,401,914 | 9/1968 | Shaud | 251/174 X |

*Primary Examiner*—Harold W. Weakley
*Attorney*—Oberlin, Maky, Donnelly & Renner ABSTRACT: A seal assembly for a rotary ball valve having a sealing ring conically undercut on its rear face, and a backing ring mating with the undercut face as described in U.S. Pat. No. 3,387,815, includes a complementary interfitting circumferential ridge and recess on said mated surfaces.

SEAT ASSEMBLY FOR ROTARY BALL VALVES

This invention relates to seal assemblies for rotary ball valves.

Such valves include a ball with a diametral aperture therein, the ball being turned to align the aperture with fluid inlet and outlet ports in open position and the surface of the ball closing said ports in closed position. To prevent leakage of fluid around the ports, a sealing or seat assembly is provided between the valve casing surrounding the ports and the ball surface.

In order to explain the invention more clearly, one example of an assembly of the prior art as disclosed in our U.S. Pat. No. 3,387,815, will be described in relation to FIG. 1, which shows the assembly in section with ball 14 in open position, and with the parts slightly separated for clarity.

The assembly includes a sealing ring 10, its forward face 10a shaped to seal against the ball 14, and its rear face 15 conically inclined inwards towards the ball (or "undercut"), a backing ring 11 of hard material with its forward face 16 conical to fit the rear face 15 of said sealing ring, backing ring 11 being urged by a washer-type spring 12 axially of the port 22 against sealing ring 10.

Owing to the undercut configuration, the backing ring 11 also urges sealing ring 10 radially outwards to make a good seal with the periphery of the port 22.

A valve seat assembly of the above general kind will be referred to as a "wedge seal" assembly.

For ball valves of larger size, the ratio of radial dimension of the sealing ring to its diameter becomes less. There is a tendency under high pressure for the sealing ring to be forced outwards along the ball surface and either distort (with consequent leakage) or actually fracture.

It is an object of this invention to prevent such distortion or blowout in wedge seal assemblies.

It is another object to prevent displacement of the sealing ring in wedge seal assemblies.

Accordingly the invention, comprises a wedge seal assembly in which the conical mating faces of the sealing ring and the backing ring include a complementary interfitting ridge and recess thereon.

Figure 1:
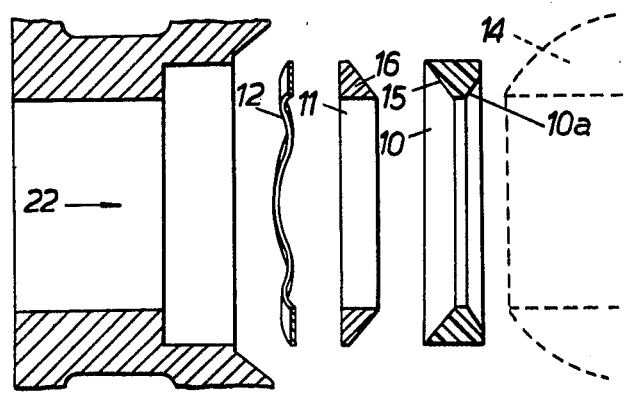
FIG. 1 is an exploded view of a valve assembly.
Figure 2:
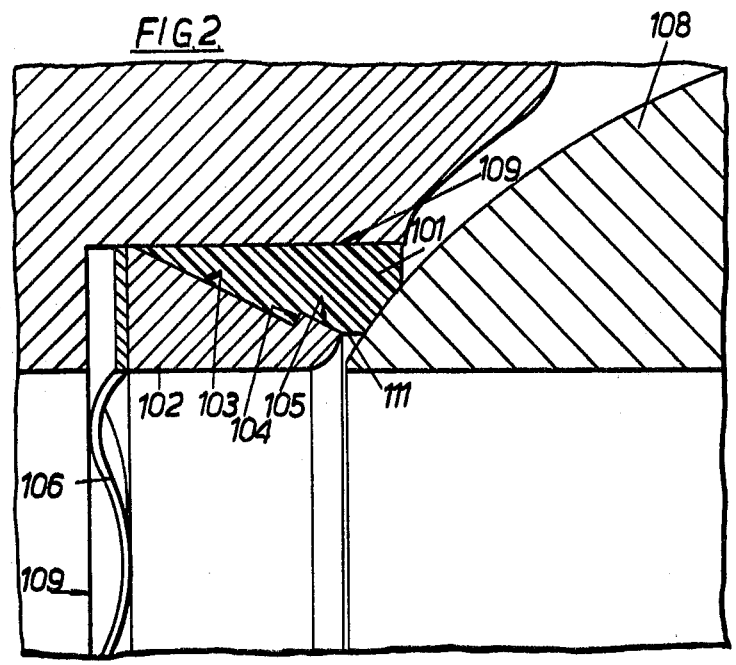
FIG. 2 shows one exemplary embodiment of an assembly according to the invention, shown in part section on a scale larger than in FIG. 1.

A sealing ring 101 of wedge form has an interface with a backing ring 102, this interface comprising a first conical undercut part 103, a second part 104, being a step extending more or less radially outward, and a third conical part 105, also undercut. The angles of the conical first and third parts 103, 105 may be equal and the second part 104 may be at right angles to them. The backing ring 102 is urged to the right in the FIG. 2 by spring 106.

In use, the backing ring 102 engages all three parts. Pressure on the conical parts acts, as before, to press the sealing ring 101 at surface 107 against the ball 108 and peripherally against the inlet or outlet port 109 at 110. Any tendency, however, for the sealing ring 101 to blowout or be squeezed out of shape either towards or away from the ball 108 is resisted by the engagement of the notch 104 with the rigid backing ring 102.

The seal assembly described may include a cylindrical part 111 extending in the direction of the ball on sealing ring 101, part of which is internally supported by backing ring 102.

Particularly for large diameter assemblies, this construction enables the sealing ring to be made a closer fit to the backing ring and prevents any slight radial play between them.

While the interface between rings 101 and 102 has been shown "stepped," it will be appreciated that it may be of other forms. For example, an interfitting tongue and groove falls within the invention.

While the projection is shown on the backing ring and the recess on the sealing ring, the reverse arrangement (recess on the backing ring and projection on the sealing ring) may be used.

In some circumstances the ridge and recess, while still circumferential, may be discontinuous, that is, it may comprise a series of spaced arcuate ridges and recesses separated by areas of plain conical form.

What I claim is:

1. A sealing assembly for a rotary ball valve of the type including a sealing ring, its forward face shaped to seal against the ball and its rear face conically inclined inwards towards the ball, a backing ring of hard material with its forward face conical to mate with said rear face of said sealing ring, said backing ring being urged towards said sealing ring and said ball characterized in that the mating conical faces of said rings include a complementary interfitting circumferential ridge and recess therein.

2. An assembly as claimed in claim 1, in which the interface of said mating surfaces is formed of a rear conical surface (furtherest from said ball), a front conical surface, and a step joining said front and rear surfaces.

3. An assembly as claimed in claim 2, in which said sealing ring includes a cylindrical surface extending from the front of said front conical surface towards said ball and forward extension of said backing ring supports said cylindrical surface internally.